(12) United States Patent  
Park

(10) Patent No.: US 8,872,730 B2
(45) Date of Patent: *Oct. 28, 2014

(54) PORTABLE DEVICE AND METHOD FOR CONTROLLING THE SAME

(71) Applicant: LG Electronics Inc., Seoul (KR)

(72) Inventor: Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,445

(22) Filed: Nov. 4, 2013

(65) Prior Publication Data

US 2014/0062931 A1 Mar. 6, 2014

Related U.S. Application Data

(63) Continuation of application No. 13/858,816, filed on Apr. 8, 2013, now Pat. No. 8,593,371, which is a continuation of application No. 13/544,772, filed on Jul. 9, 2012, now Pat. No. 8,416,148.

(30) Foreign Application Priority Data

May 14, 2012 (KR) ........................ 10-2012-0051093

(51) Int. Cl.
*G09G 5/00* (2006.01)
*G06F 1/16* (2006.01)
*G06F 3/0488* (2013.01)
*G06F 3/041* (2006.01)

(52) U.S. Cl.
CPC .............. *G06F 3/041* (2013.01); *G06F 1/1647* (2013.01); *G06F 3/04883* (2013.01); *G06F 1/1694* (2013.01)

USPC ............................ 345/1.1; 345/173; 455/566

(58) Field of Classification Search
USPC ......... 345/1.1–7, 156–178; 178/18.01–18.09, 178/18.11; 455/566

See application file for complete search history.

(56) References Cited

U.S. PATENT DOCUMENTS

| 7,460,108 | B2 | 12/2008 | Tamura |
| 7,657,849 | B2 | 2/2010 | Chaudhri et al. |
| 2006/0277488 | A1 | 12/2006 | Cok et al. |
| 2010/0099394 | A1 | 4/2010 | Hainzl |
| 2010/0306693 | A1 | 12/2010 | Brinda |
| 2011/0001687 | A1 | 1/2011 | Srinivasan et al. |
| 2011/0247065 | A1 | 10/2011 | Melnyk |

FOREIGN PATENT DOCUMENTS

| KR | 20-0442784 Y1 | 12/2008 |
| KR | 10-2010-0007127 A | 1/2010 |
| WO | WO 2011/096675 A2 | 8/2011 |

*Primary Examiner* — Stephen Sherman
(74) *Attorney, Agent, or Firm* — Birch, Stewart, Kolasch & Birch, LLP

(57) ABSTRACT

A method for controlling a portable device and which includes detecting one of a first unlock command for switching a state of a first display unit to an active state and maintaining a state of a second display unit in a locked state or a second unlock command for switching the state of the first display unit to the active state and switching the state of the second display unit to a ready-to-activate state; switching the states of the first and second display units to the active state and the ready-to-activate state, respectively, when the second unlock command is detected; detecting an unlock trigger; and switching the second display unit to the active state according to the detected unlock trigger.

30 Claims, 20 Drawing Sheets

PORTABLE DEVICE AND METHOD FOR CONTROLLING THE SAME

The present application is a Continuation of U.S. patent application Ser. No. 13/858,816 filed Apr. 8, 2013, which is a 37 C.F.R. §1.53(b) continuation of U.S. patent application Ser. No. 13/544,772 filed Jul. 9, 2012, now U.S. Pat. No. 8,416,148, which claims the benefit of Korean Patent Application No. 10-2012-0051093, filed on May 14, 2012, all of which are hereby incorporated by reference and for which priority is claimed under 35 U.S.C. §120.

BACKGROUND OF THE INVENTION

1. Field of the Invention

The present invention relates to a portable device, and more particularly, to a portable device including double-sided displays and a method for controlling the same.

2. Discussion of the Related Art

As the use of portable devices has increased, users can now use various services such as web surfing and electronic financial transactions as well as communication between individuals and music listening using portable devices. Services, which have been provided through computers, are now also provided through portable devices to allow users to use such services regardless of time and place.

However, since the portable device provides a limited-size display in order to increase portability, there is inconvenience in using various services. Thus, a double-sided-display portable device includes a display unit at the front side and a display unit at the rear side to increase user convenience compared to the conventional portable device. Since the double-sided-display portable device includes two display units, there is a need to provide a method for unlocking a plurality of display units.

SUMMARY OF THE INVENTION

Accordingly, the present invention is directed to a portable device and a method for controlling the same that substantially obviate one or more problems due to limitations and disadvantages of the related art.

An object of the present invention is to provide a portable device including a plurality of display units and a method for controlling the same.

Another object of the present invention is to provide an unlock interface that increases user convenience associated with the plurality of display units and to control state switching of the plurality of display units.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a portable device including display units at both surfaces of the portable device may include detecting an unlock command for the portable device, the unlock command being one of a first command which is to switch a state of a first display unit, which is located at a user side, to an active state and to maintain a state of a second display unit, which is located opposite the first display unit, in a locked state or a second command which is to switch the state of the first display unit to an active state and to switch the state of the second display unit to a ready-to-activate state, switching the state of the first display unit to an active state and switching the state of the second display unit to a ready-to-activate state when the unlock command is the second command, detecting an unlock trigger for the second display unit, the unlock trigger serving to switch a display unit, which is in a ready-to-activate state, to an active state, and switching the second display unit, which is in the ready-to-activate state, to an active state according to the detected unlock trigger.

In the method for controlling the portable device according to an embodiment of the present invention, the unlock trigger for the second display unit may be generated as the portable device is rotated such that the second display unit faces a user or may be generated upon execution of an application that runs in conjunction with the second display unit.

In the method for controlling the portable device according to an embodiment of the present invention, when the portable device is rotated, the switching of the second display unit to an active state may include activating a light emitting element of the second display unit when the portable device has been rotated by a first threshold angle and activating a touch sensor of the second display unit when the portable device has been rotated by a second threshold angle that is equal to or greater than the first threshold angle.

The method for controlling the portable device according to an embodiment may further include deactivating at least one of a light emitting element and a touch sensor of the first display unit when the portable device rotates.

In the method for controlling the portable device according to an embodiment of the present invention, when the application that runs in conjunction with the second display unit is executed, the switching of the second display unit to an active state may include selectively activating at least one of a light emitting element and a touch sensor of the second display unit according to control of the application.

The method for controlling the portable device according to an embodiment may further include deactivating, when the application is terminated, the at least one of the light emitting element and the touch sensor of the second display unit that has been activated.

In the method for controlling the portable device according to an embodiment of the present invention, the unlock trigger may be detected through at least one of a touch sensor, a gravity sensor, a motion sensor, a gyro sensor, an acceleration sensor, an inclination sensor, and a brightness sensor.

In the method for controlling the portable device according to an embodiment of the present invention, the second command may be detected simultaneously by a touch sensor of the first display unit and a touch sensor of the second display unit.

In the method for controlling the portable device according to an embodiment of the present invention, detecting the unlock command may include receiving the unlock command through a touch sensor and determining whether the unlock command is the first command or the second command based on a touch region detected by the touch sensor.

The method for controlling the portable device according to an embodiment may further include displaying content on the second display unit, wherein the content may be associated with content that is displayed on the first display unit when the unlock trigger for the second display unit is detected.

In another aspect of the present invention, a portable device including display units at both surfaces of the portable device may include a sensor unit for detecting a user input, a first display unit which is located at a user side from among the display units, a second display unit which is located opposite the first display unit, and a controller, wherein the controller may perform operations including an operation for detecting an unlock command for the portable device using the sensor unit, the unlock command being one of a first command which is to switch a state of the first display unit to an active state and to maintain a state of the second display unit in a locked state or a second command which is to switch the state of the first display unit to an active state and to switch the state of the second display unit to a ready-to-activate state, an operation for switching the state of the first display unit to an active state and switching the state of the second display unit to a ready-to-activate state when the unlock command is the second command, an operation for detecting an unlock trigger for the second display unit, the unlock trigger serving to switch a display unit, which is in a ready-to-activate state, to an active state, and an operation for switching the second display unit, which is in the ready-to-activate state, to an active state according to the detected unlock trigger.

In the portable device according to an embodiment of the present invention, the unlock trigger for the second display unit may be generated as the portable device is rotated such that the second display unit faces a user or may be generated upon execution of an application that runs in conjunction with the second display unit.

In the portable device according to an embodiment of the present invention, when the portable device is rotated, the operation for switching the second display unit to an active state may include activating a light emitting element of the second display unit when the portable device has been rotated by a first threshold angle and activating a touch sensor of the second display unit when the portable device has been rotated by a second threshold angle that is equal to or greater than the first threshold angle.

In the portable device according to an embodiment of the present invention, the controller may further perform an operation for deactivating at least one of a light emitting element and a touch sensor of the first display unit when the portable device rotates.

In the portable device according to an embodiment of the present invention, when the application that runs in conjunction with the second display unit is executed, the operation for switching the second display unit to an active state may include selectively activating at least one of a light emitting element and a touch sensor of the second display unit according to control of the application.

In the portable device according to an embodiment of the present invention, the controller may further perform an operation for deactivating, when the application is terminated, the at least one of the light emitting element and the touch sensor of the second display unit that has been activated.

In the portable device according to an embodiment of the present invention, the unlock trigger may be detected through at least one of a touch sensor, a gravity sensor, a motion sensor, a gyro sensor, an acceleration sensor, an inclination sensor, and a brightness sensor.

In the portable device according to an embodiment of the present invention, the second command may be detected simultaneously by a touch sensor of the first display unit and a touch sensor of the second display unit.

In the portable device according to an embodiment of the present invention, the operation for detecting the unlock command may include receiving the unlock command through a touch sensor and determining whether the unlock command is the first command or the second command based on a touch region detected by the touch sensor.

In the portable device according to an embodiment of the present invention, the controller may further perform an operation for displaying content on the second display unit, wherein the content may be associated with content that is displayed on the first display unit when the unlock trigger for the second display unit is detected.

It is to be understood that both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
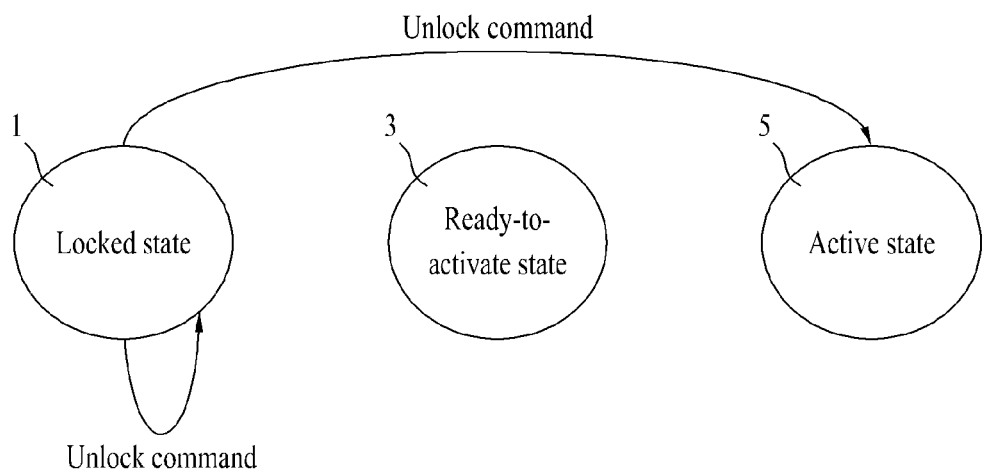
FIGS. 1A, 1B, and 1C illustrate state switching of the portable device according to an embodiment of the present invention.

Although embodiments of the present invention will be described in detail with reference to the accompanying drawings and information written on the drawings, the present invention is not limited or restricted by the embodiments.

Although most terms of elements in the present invention have been selected from general ones widely used in the art taking into consideration functions thereof in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the overall content of this specification together with the intended meanings of the terms rather than their simple names or meanings.

A display unit included in the portable device displays content, an application, or the like to the user. The portable device of the present invention may include display units respectively on the front and rear surfaces of the portable device. A display unit located at the user side may be referred to as a first display unit and a display unit located at the opposite side may be referred to as a second display unit, regardless of whether the display unit is provided on the front or rear surface of the portable device. The portable device of the present invention may include a flexible display unit and may also include a flexible display unit that is folded to be provided on both surfaces of the portable device. In this case, a portion of the folded flexible display that is provided at the user side may be referred to as a first display unit and a portion thereof provided at the opposite side may be referred to as a second display unit.

The portable device of the present invention may switch states of each display unit through an unlock command or an unlock trigger and the state of the display unit may be switched from one of the three states, an unlock state, a ready-to-activate state, and an active state, to another state.

The term "locked state" refers to a state in which the display unit is inactive and at least one of a light emitting element and a touch sensor of the display unit is inactive. When the display unit is in a locked state, the portable device cannot provide an application or content to the user through the display unit. However, the portable device may partially activate the touch sensor or the light emitting element of the display unit in order to detect an unlock command input by the user or to inform the user of how to input an unlock command.

The term "ready-to-activate state" refers to a standby state before the display unit switches to an active state. When the portable device has detected an unlock command, the portable device may not switch the display unit directly to an active state but may instead switch the display unit to a ready-to-activate state and then switch the display unit from the ready-to-activate state to an active state when the portable device has additionally detected an unlock trigger. That is, when the display unit is in the ready-to-activate state, the portable device may switch the display unit to an active state through an unlock trigger alone even when an unlock command has not been given, unlike when the display unit is in the locked state.

When the display unit is in the ready-to-activate state, at least one of the light emitting element and the touch sensor of the display unit is inactive. In the ready-to-activate state, the portable device is in a state before providing an application or content to the user through the display unit, similar to the locked state. However, the portable device may partially activate the touch sensor or the light emitting element of the display unit in order to detect an unlock trigger input by the user or to inform the user of how to input an unlock trigger.

The term "active state" refers to a state in which the display unit is active. When the display unit is switched to the active state, the portable device may activate at least one of the light emitting element and the touch sensor of the display unit. The term "light emitting element" may refer to a device for emitting light which can change luminance of the display unit. For example, the light emitting element may include a self-emissive diode included in a display unit such as a Light Emitting Diode (LED) or an Organic Light Emitting Diode (OLED). In addition, when the light emitting element is not a self-emissive display, the light emitting element may include a backlight provided in the display unit.

The portable device may sense user touch, display content, or execute an application using at least one of the light emitting element and the touch sensor which has been activated.

FIG. 1 illustrates state switching of the portable device according to an embodiment of the present invention. In FIG. 1, circular nodes represent a locked state 1, a ready-to-activate state 3, and an active state 5 of the display unit. Each arrow above the nodes indicates state switching of the first display unit and each arrow below the nodes indicates state switching of the second display unit which is located at the opposite side to the first display unit.

In the portable device of the present invention, the second display unit may be located at the opposite side of the portable device to the user such that the second display unit may not be exposed to the eyes of the user. Thus, the second display unit may be unnecessarily activated, causing unnecessary power consumption. In addition, when the portable device is gripped by the user, activation of a touch sensor of the second display unit may cause erroneous operation by unintended touch. Accordingly, when an unlock command is detected, the portable device of the present invention may switch the state of the second display unit to the ready-to-activate state rather than immediately switching the same to the active state. Thereafter, when an unlock trigger for the second display unit is detected, the portable device may switch the state of the second display unit to the active state.

The portable device of the present invention can discriminate and detect a plurality of unlock commands and may perform state switching of the display unit differently according to each unlock command. The following is a description of state switching of the display units according to each unlock command.

FIG. 1A illustrates state switching of the display units associated with an unlock command when the state of the first display unit is switched from the locked state 1 to the active state 5 and the state of the second display unit is maintained in the locked state 1. The first display unit may be switched from the locked state 1 to the active state 5 and at least one of a light emitting element and a touch sensor of the first display unit may be activated. The second display unit may be maintained in the locked state 1 and a light emitting element and a touch sensor of the second display unit may be maintained in the current states. Accordingly, for FIG. 1A, the portable device may display and provide content to the user and execute and provide an application to the user using the first display unit.

Figure 1B:
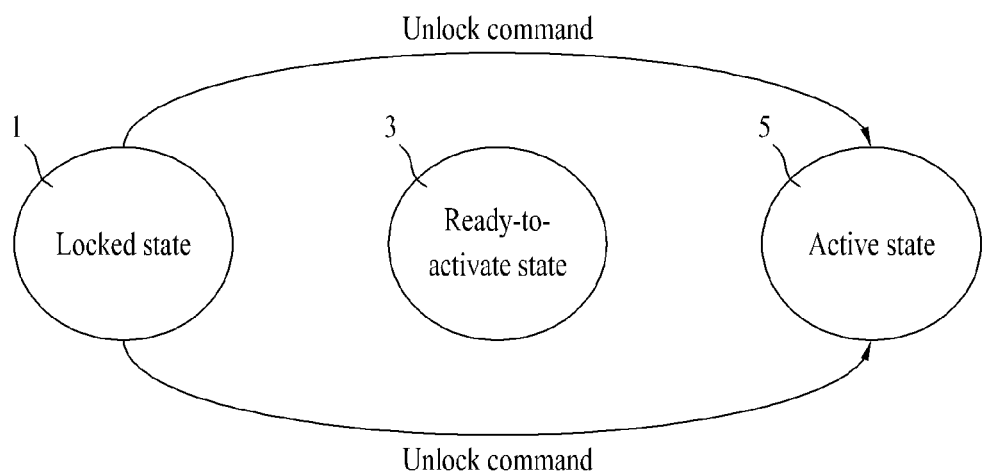

FIG. 1B illustrates state switching of the display units associated with an unlock command when the states of the first display unit and the second display unit are switched from the locked state 1 to the active state 5.

The first display unit and the second display unit may be switched from the locked state 1 to the active state 5 and at least one of the light emitting element and the touch sensor of each of the first display unit and the second display unit may be activated. Accordingly, the portable device may display and provide content to the user and execute and provide an application to the user using the first display unit and the second display unit. However, the first and second display units cannot be simultaneously exposed to the eyes of the user since the first and second display units are directed in opposite directions. Accordingly, when both the first and second display units are activated through one unlock command, one of the first and second display units, which is not exposed to the eyes of the user, may unnecessarily consume power or may cause erroneous operation by unintended touch.

Figure 1C:
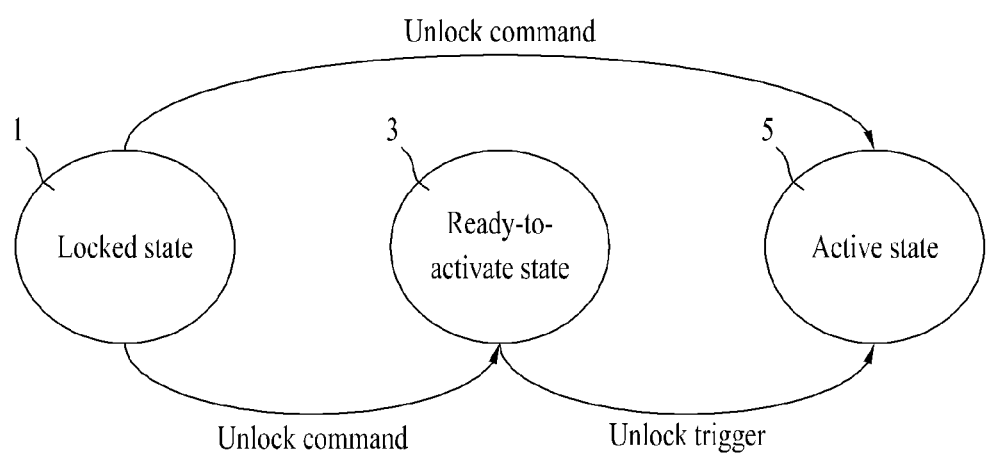

FIG. 1C illustrates state switching of the display units associated with an unlock command when the state of the first display unit is switched from the locked state 1 to the active state 5 and the state of the second display unit is switched from the locked state 1 to the ready-to-activate state 3.

The first display unit may be switched from the locked state 1 to the active state 5 and at least one of the light emitting element and the touch sensor of the first display unit may be activated. As described above, the portable device may display and provide content to the user and execute and provide an application to the user using the first display unit. At least one of the light emitting element and the touch sensor of the second display unit which has been switched to the ready-to-activate state 3 is in an inactive state. Here, similar to the locked state, the portable device is in a state before providing an application or content to the user through the second display unit. However, unlike the locked state, the portable device is in a state in which the portable device can be switched to an active state when an unlock command is detected. The portable device may partially activate the light emitting element or the touch sensor of the second display unit in order to detect an unlock trigger or to inform the user of how to input an unlock trigger.

Figure 2A:
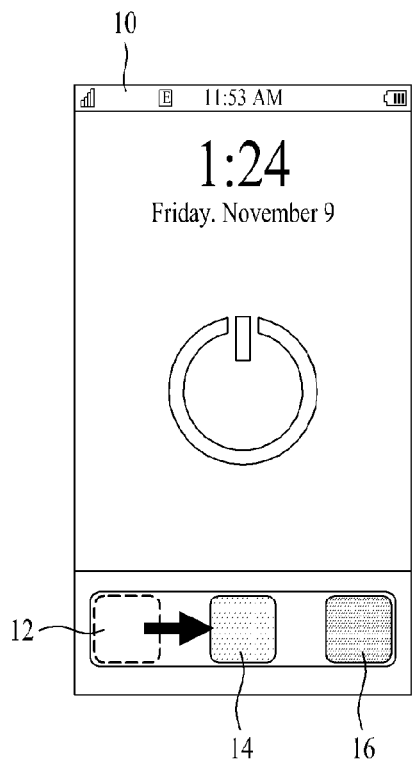
FIGS. 2A and 2B illustrate an unlock command of a portable device according to an embodiment of the present invention.

FIG. 2 illustrates an unlock command of a portable device according to an embodiment of the present invention. Specifically, FIG. 2A illustrates a situation in which a command to unlock the first display unit, which is in a locked state, is input through one slide bar located at the first display unit. The portable device 10 can discriminate a plurality of unlock commands based on a region where a user touch input is detected. That is, the portable device 10 may identify and detect one of the three unlock commands described above with reference to FIG. 1.

In the following, an unlock command which is to switch the state of the first display unit to an active state and to maintain the state of the second display unit in a locked state is defined as a first command. In addition, an unlock command which is to switch the state of the first display unit to an active state and to switch the state of the second display unit to a ready-to-activate state is defined as a second command. Further, an unlock command which is to switch the states of the first and second display units to an active state is defined as a third command.

In an embodiment of the present invention, the portable device can determine whether the unlock command is the first command, the second command, or the third command according to a region where touch input is detected. The following is a description of an embodiment associated with the first and second commands. Of course, the following embodiment can be extended to the third command.

When an unlock tab 12 located in a dotted portion in FIG. 2A is moved only to the center of the slide bar through touch input (as denoted by "14" in FIG. 2A), the portable device may determine that the input command is the first command and may then switch the state of the first display unit to an active state. The portable device 10 may provide an application using the first display unit which is in an active state and the second display unit may be maintained in a locked state.

When the unlock tab 12 located in a dotted portion in FIG. 2A is moved to near a right boundary of the slide bar through touch input (as denoted by "16" in FIG. 2A), the portable device may determine that the input command is the second command and may then switch the state of the first display unit to an active state and switch the state of the second display unit to a ready-to-activate state. This allows the portable device 10 to switch the state of the second display unit to an active state upon detection of an unlock trigger while providing an application and content through the first display unit.

Figure 2B:
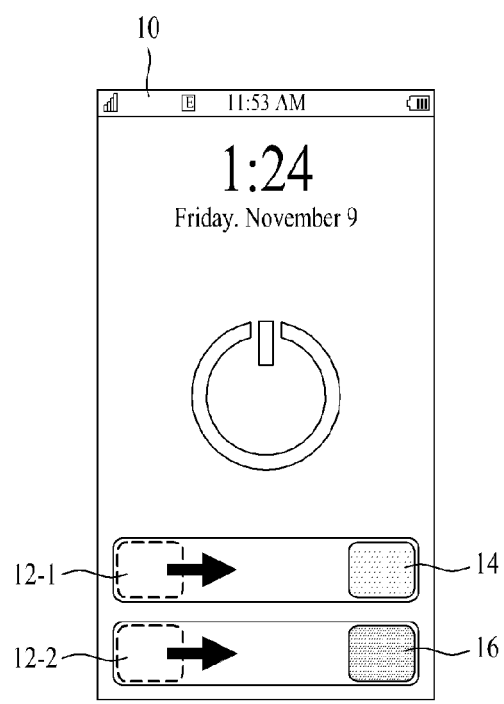

FIG. 2B illustrates a method for detecting an unlock command using two slides located on the first display unit. When an unlock tab 12-1 located in a dotted portion of the upper slide bar is slid through touch input (as denoted by "14"), the portable device may determine that the input command is the first command and may then switch the state of the first display unit to an active state. The portable device 10 may provide an application using the first display unit that is in an active state. Here, the second display unit may be maintained in a locked state.

When the unlock tab 12-2 located in a dotted portion of the lower slide bar in FIG. 2B is slid through touch input (as denoted by "16" in FIG. 2B), the portable device 10 may determine that the input command is the second command and may then switch the state of the first display unit to an active state and switch the state of the second display unit to a ready-to-activate state. This allows the portable device 10 to switch the state of the second display unit to an active state upon detection of an unlock trigger while providing an application and content through the first display unit. The unlock trigger will be described later in detail with reference to FIG. 5.

Figure 3A:
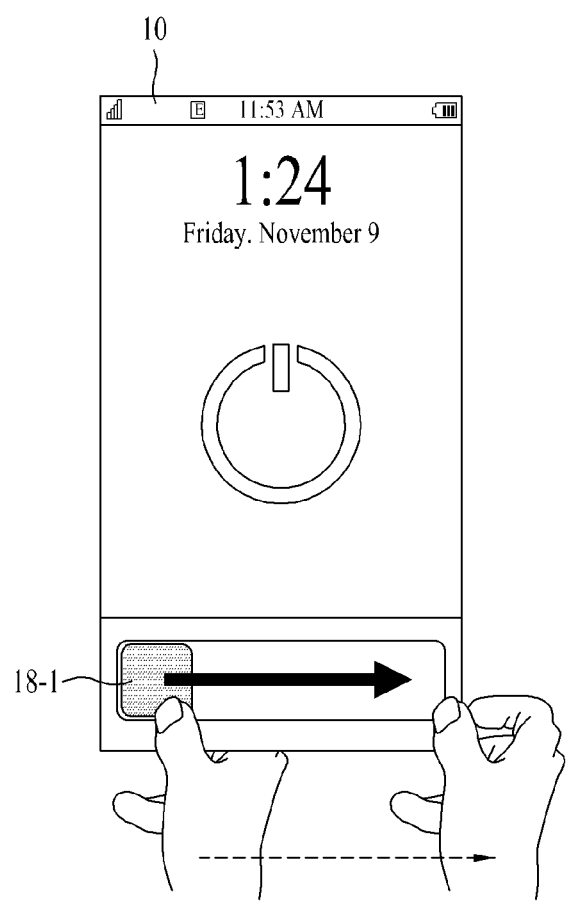
FIGS. 3A and 3B illustrate an unlock command of a portable device according to another embodiment of the present invention.

Next, FIG. 3 illustrates an unlock command of a portable device according to another embodiment of the present invention. The portable device 10 according to an embodiment of the present invention may identify and detect the position and direction of a touch input from the user and may execute an unlock command corresponding to the detected position and direction. The portable device 10 may display a position-variable unlock tab adaptively according to a touch input of the user. In more detail, when the user touches a left region of the slide bar as shown in FIG. 3A, the portable device may generate an unlock tab 18-1 in the left region of the slide bar. When the unlock tab 18-1 is slid to the right region through touch input, the portable device may identify this as the first command and may switch the state of the first display unit to an active state. The portable device may provide content, an application, or the like using the first display unit. Here, the second display unit may be maintained in a locked state.

Figure 3B:
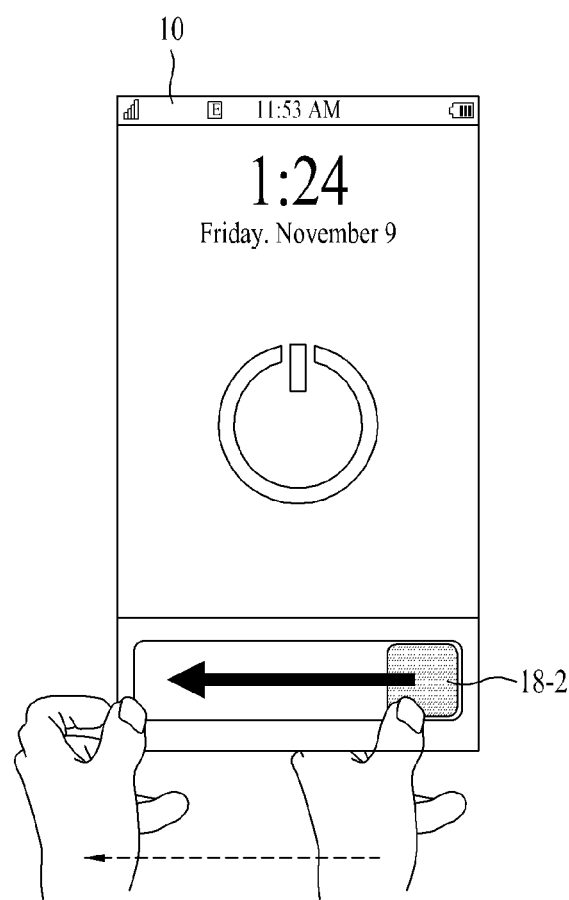

When the user touches a right region of the slide bar as shown in FIG. 3B, an unlock tab 18-2 may be generated in the right region of the slide bar. When the unlock tab 18-2 is slid to the left region through touch input, the portable device may identify this as the second command and may switch the state of the first display unit to an active state and switch the state of the second display unit to a ready-to-activate state. The first display unit which is in an active state may activate at least one of the light emitting and the touch sensor of the first display unit. The leftward and rightward unlock directions of the position-variable unlock tabs described above may be reversed and the rightward and leftward sliding directions of the position-variable unlock tab, which define the first and second commands, may also be reversed according to an embodiment. That is, the portable device may detect an unlock command as the second command when the unlock command is input in a rightward direction as shown in FIG. 3A and may detect an unlock command as the first command when the unlock command is input in a leftward direction as shown in FIG. 3B.

Accordingly, the portable device 10 of the present invention may identify and detect the direction of a touch input of the user and may switch only the first display unit to an active state or may switch the first display unit to an active state and switch the second display unit to a ready-to-activate state according to the detected direction.

In addition, in the example of FIGS. 3A and 3B, when the portable device 10 simultaneously detects a touch input on the unlock tab 18-1 displayed on the first display unit and a touch input on a corresponding region of the second display unit which is located at the opposite side to the unlock tab 18-1 and then detects that the unlock tab 18-1 is slid to the right region through the touch input as described above, the portable device may identify this as the second command regardless of the sliding direction of the unlock touch input. For example, this corresponds to when the user performs an unlock touch input on each of the first display unit and the second display unit using a thumb and an index finger with the same hand form as shown in FIGS. 3A and 3B.

That is, the portable device 10 may detect an unlock touch input as the first command when the unlock touch input is detected only on the first display unit and may detect an unlock touch input as the second command when the unlock touch input is simultaneously detected on the first and second display units, regardless of the sliding direction of the unlock touch input.

Figure 4A:
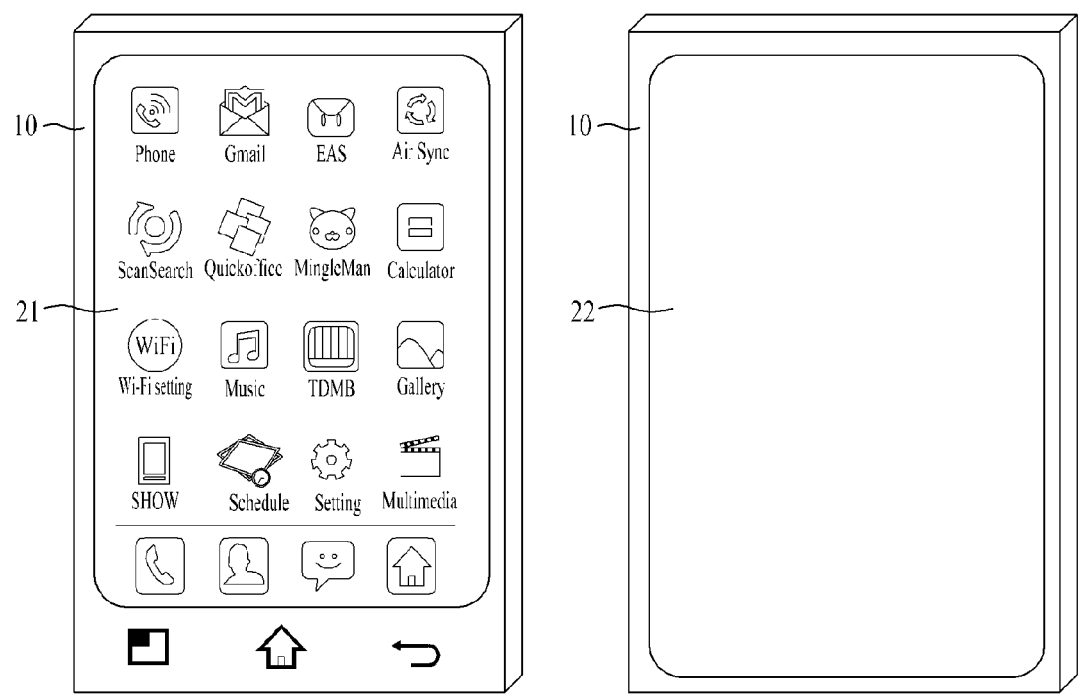
FIGS. 4A and 4B illustrate a locked state and an unlocked state of a portable device according to an embodiment of the present invention.

FIG. 4 illustrates a locked state, a ready-to-activate state, and an active state of a portable device according to an embodiment of the present invention. Specifically, FIG. 4A illustrates when a touch sensor of a first display unit 21 of a portable device 10 senses an unlock command such that the state of the first display unit 21 is switched to an active state and the state of the second display unit 22 is maintained in a locked state or a ready-to-activate state. That is, this is when the first command or the second command described above with reference to FIG. 2 is detected. The light emitting element and the touch sensor of the first display unit 21 may be activated to sense user touch or to display content and execute an application.

The portable device 10 may maintain at least one of the light emitting element and the touch sensor of the second display unit 22, which is in a locked state or a ready-to-activate state, in an inactive state. That is, the portable device 10 may activate only the light emitting element of the second display unit while maintaining the touch sensor in an inactive state or may activate only the touch sensor while maintaining the light emitting element in an inactive state. The portable device 10 may also maintain both the light emitting element and the touch sensor in an inactive state.

Accordingly, the portable device 10 can reduce power consumed by the second display unit 22, thereby achieving power saving effects. The portable device 10 can also prevent detection of an unintended touch input by the touch sensor of the second display unit 22.

Figure 4B:
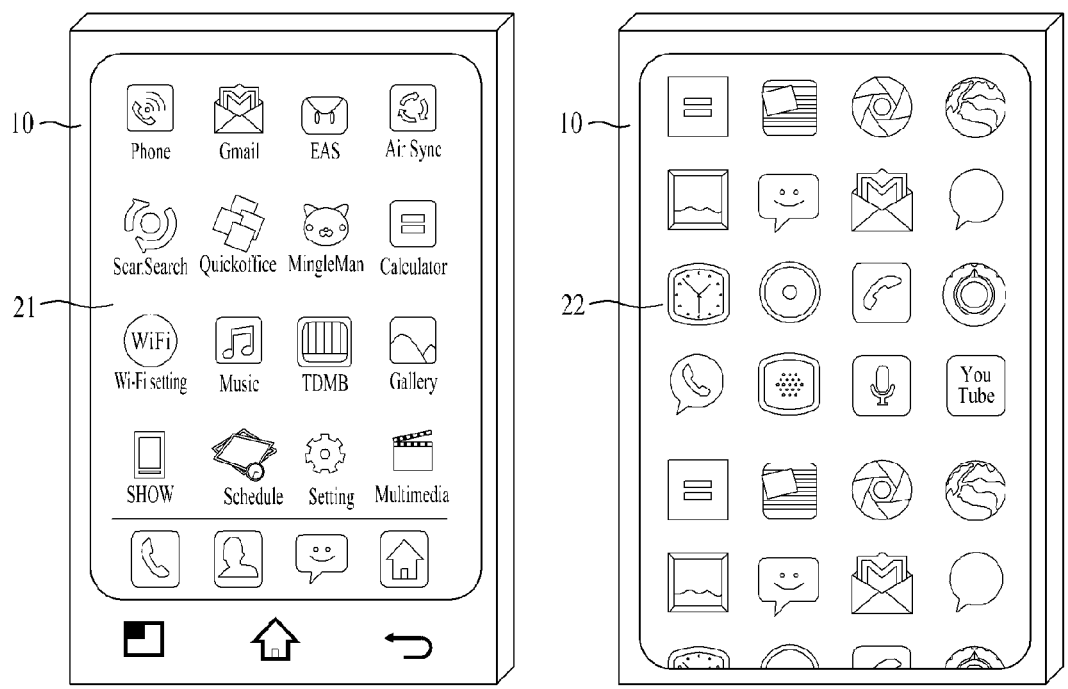

FIG. 4B illustrates when the states of the first and second display units 21 and 22 are switched to an active state. When the portable device 10 has detected an unlock trigger after detecting the second command or has detected the third command, the state of each of the first and second display units 21 and 22 is switched to an active state. Unlock trigger types will be described later in detail with reference to FIG. 5.

When the first and second display units 21 and 22 are in an active state, icons of applications may be arranged on the first and second display units 21 and 22 and each of the display units may sense user touch or display content and may execute an application. According to an embodiment of the present invention, different icons may be displayed and arranged on the first and second display units 21 and 22 at positions preset by the user.

According to another embodiment of the present invention, the same icons may be displayed on the first and second display units. Accordingly, when the front and rear surfaces of the portable device 10 are identical such that it is difficult to discriminate between the front and rear surfaces, the portable device 10 can provide the same user environment, regardless of whether the user uses the first display unit or the second display unit.

Next, FIG. 5 illustrates an unlock trigger according to an embodiment of the present invention. As described above, when the second command is detected, the portable device of the present invention may switch the state of the first display unit to an active state and switch the state of the second display unit to a ready-to-activate state and may then switch the state of the second display unit to an active state when an unlock trigger for the second display unit is detected. Here, the unlock trigger may be a trigger for switching a display unit, which is in a ready-to-activate state, to an active state.

Figure 5A:
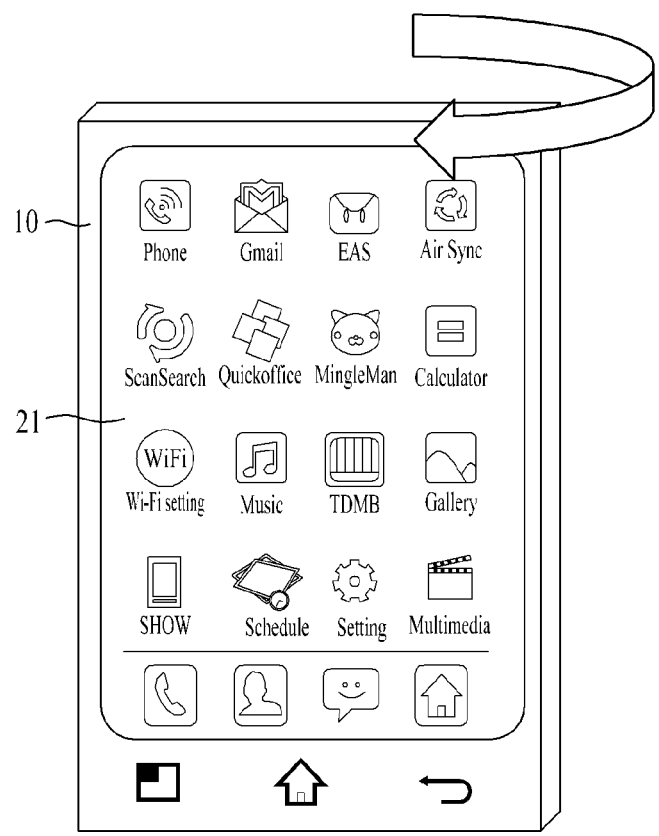
FIGS. 5A and 5B illustrate an unlock trigger according to an embodiment of the present invention.

In an example of FIG. 5A, the portable device 10 may detect rotation, movement, overturning, or the like and may identify such rotation, movement, or overturning as an unlock trigger. When the portable device 10 is rotated, moved, or overturned such that the second display unit faces the user, the portable device 10 may detect such rotation, movement, or overturning as an unlock trigger and may then switch the state of the second display unit to an active state. Detection of the unlock trigger may be performed using at least one of a touch sensor, a gravity sensor, a motion sensor, a gyro sensor, an acceleration sensor, an inclination sensor, and a brightness sensor. Switching of a display unit to an active state may include activating at least one of a light emitting element and a touch sensor of the display unit.

However, while the portable device 10 detects rotation, the portable device 10 may deactivate at least one of a light emitting element and a touch sensor of each of the first and second display units. In this instance, even when an unlock trigger is detected, the portable device may temporarily deactivate each touch sensor to prevent detection of a touch input unintended by the user while the portable device is rotating. Here, the portable device 10 may deactivate the touch sensors of the first and second display units at different times.

In addition, when the portable device rotates, the portable device may deactivate a display unit that is not exposed to the eyes of the user. That is, in FIG. 5A, the portable device may deactivate the first display unit 21 to achieve power saving effects since the first display unit 21 is not exposed to the eyes of the user due to rotation of the portable device. When the portable device rotates, the light emitting element of the second display unit 22 may be activated to provide corresponding information to the user. That is, upon detecting rotation of the portable device, the portable device may activate the light emitting element of the second display unit to provide corresponding information to the user. The portable device may activate the touch sensor of the second display unit after the portable device completes rotation.

Figure 5B:
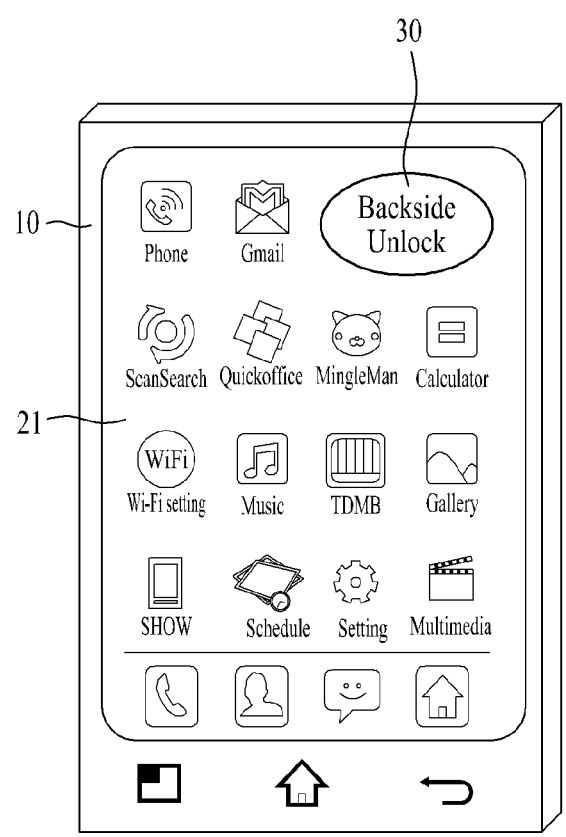

FIG. 5B illustrates a method for detecting a touch input performed for a first display unit as an unlock trigger. The portable device 10 may display an unlock interface 30 for switching the state of the second display unit to an active state on a specific region of the first display unit 21. A touch input performed on the unlock interface 30 may be detected as an unlock trigger for switching the state of the second display unit to an active state. When a touch input performed on the unlock interface 30 is detected, the portable device 10 may activate at least one of the light emitting element and the touch sensor of the second display unit to switch the state of the second display unit to an active state.

When the state of the second display unit has been switched to an active state, the displayed unlock interface 30 may be used as a lock interface. When a touch input performed on the unlock interface 30 is detected after the second display unit is activated, the portable device 10 may switch the state of the second display unit to a ready-to-activate state. Accordingly, the portable device 10 may deactivate at least one of the light emitting element and the touch sensor of the second display unit.

Figure 6:
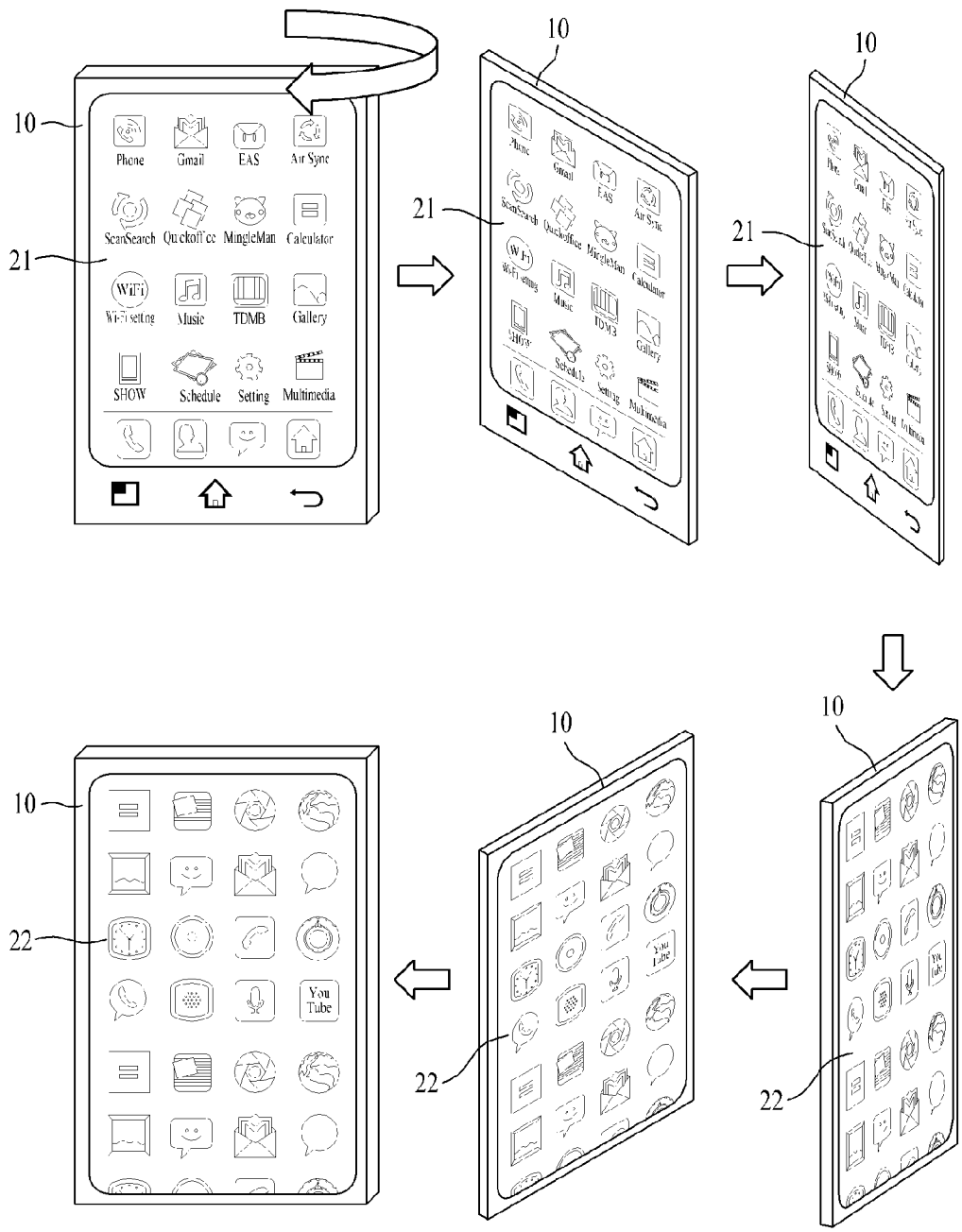
FIG. 6 illustrates a method for performing unlocking according to rotation of a portable device according to an embodiment of the present invention.

Next, FIG. 6 illustrates a method for performing unlocking according to rotation of a portable device according to an embodiment of the present invention. As described above with reference to FIG. 5A, the portable device 10 may detect rotation, movement, overturning, or the like and may identify such rotation, movement, or overturning as an unlock trigger. In the example of FIG. 6, when the portable device 10 has detected a second command before the portable device 10 rotates, the portable device 10 may switch the state of the first display unit 21 to an active state and may switch the state of the second display unit 22 to a ready-to-activate state. When rotation is detected, the portable device 10 may identify the detected rotation as an unlock trigger for the second display unit 22 and may then switch the state of the second display unit 22 to an active state.

The portable device 10 may sequentially perform state switching of the second display unit 22 according to the rotated angle. Specifically, the portable device 10 may activate the light emitting element of the second display unit 22 when the rotated angle is a first threshold angle and may activate the touch sensor of the second display unit 22 when the rotated angle is a second threshold angle. Here, the second threshold angle may be equal to or greater than the first threshold angle.

If the first threshold angle is stored as 45 degrees and the second threshold angle is stored as 180 degrees in the portable device 10, the light emitting element of the second display unit 22 may be activated when the portable device has been rotated by 45 degrees and the touch sensor of the second display unit 22 may be activated when the portable device has been rotated by 180 degrees. In this manner, the light emitting element and the touch sensor of the second display unit 22 may be activated at different times.

Through such operations, the portable device 10 can preferentially activate the light emitting element of the second display unit 22 to continuously provide content to the user and can thereafter activate the touch sensor of the second display unit 22 to prevent erroneous operation caused by unintended touch input. Since the first display unit 21 is hidden from the eyes of user as the portable device 10 rotates, the first display unit 21 may switch the state of the first display unit 21 to a ready-to-activate state.

The portable device 10 may deactivate at least one of the light emitting element and the touch sensor of the first display unit 21 according to the rotated angle. The light emitting element of the first display unit 21 may be deactivated to reduce power consumption and the touch sensor may be deactivated to prevent erroneous operation caused by unintended touch input.

The portable device 10 may sequentially perform state switching of the first display unit 21 to a ready-to-activate state according to the rotated angle. That is, the touch sensor of the first display unit 21 may be deactivated when the rotated angle is a third threshold angle and the light emitting element of the first display unit 21 may be deactivated when the rotated angle is a fourth threshold angle. Here, the fourth threshold angle may be equal to or greater than the third threshold angle.

Through such operations, the portable device 10 can preferentially deactivate the touch sensor of the first display unit 21 to prevent erroneous operation caused by unintended touch input. In addition, the first display unit 21 may be deactivated to reduce power consumption, thereby achieving power saving effects. Switching of the first display unit 21 to a ready-to-activate state may be optional and may not be applied to the portable device according to an implementation method thereof.

Figure 7A:
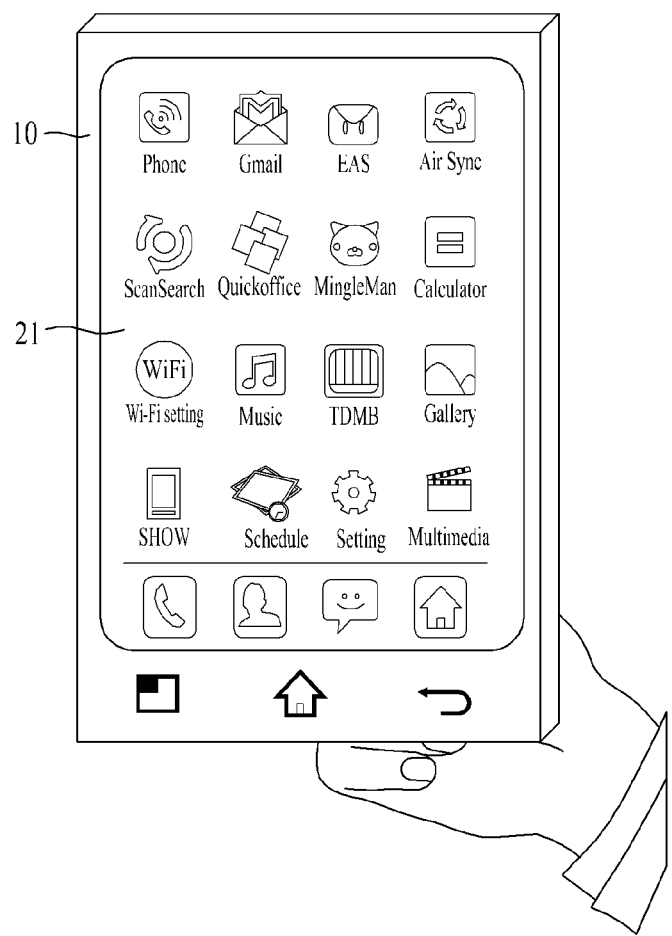
FIGS. 7A and 7B illustrate an unlock trigger according to another embodiment of the present invention.

FIG. 7 illustrates an unlock trigger according to another embodiment of the present invention. FIG. 7A illustrates a method for detecting touch input sensed by the touch sensor of the second display unit as an unlock trigger.

In order to use a touch input performed on the second display unit as an unlock trigger, the portable device 10 may activate the touch sensor of the second display unit which is in a ready-to-activate state. Accordingly, the touch sensor of the second display unit may be activated to detect a touch input performed on the second display unit as an unlock trigger.

The portable device 10 may activate the touch sensor only on a specific portion of the second display unit taking into consideration the grip form of the user and may sense a touch input performed on the specific portion through the touch sensor and detect the touch input as an unlock trigger. A touch input identified as an unlock trigger may include a specific pattern such that the state of the second display unit may be switched to an active state only when the identified touch input pattern matches a specific pattern stored in the portable device.

The portable device 10 may activate the light emitting element and the touch sensor of the second display unit when the state of the second display unit has been switched to an active state. The portable device may activate the touch sensor on an entire area of the second display unit including the specific portion described above.

Figure 7B:
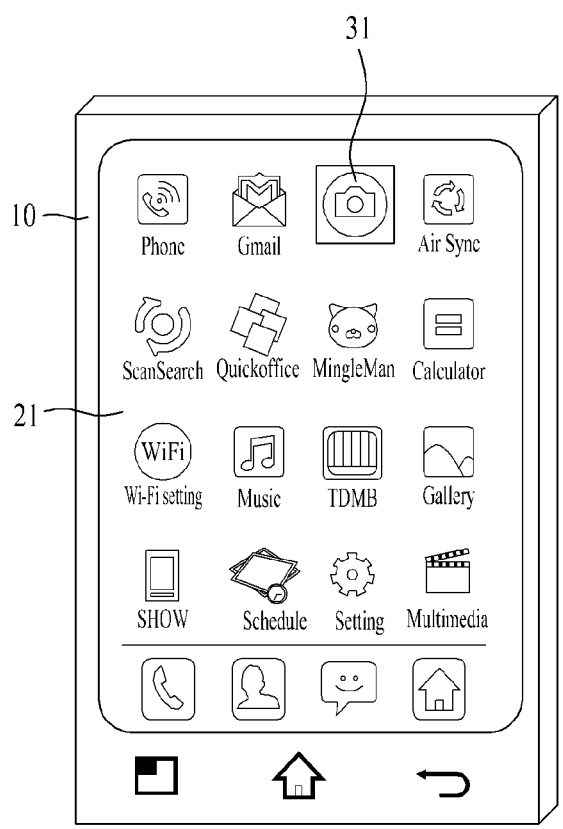

FIG. 7B illustrates a method for detecting a command to execute an application as an unlock trigger. The portable device 10 may detect a command to execute an application as an unlock trigger. An application 31 included in the portable device 10 may use double-sided display units. That is, when the application 31 is executed, the portable device 10 may activate at least one of the light emitting element and the touch sensor of the second display unit in conjunction with the first display unit. The portable device 10 may selectively activate at least one of the light emitting element and the touch sensor of the second display unit according to control of the application. An embodiment of this method will be described below with reference to FIG. 8.

When the application is terminated, the portable device 10 may deactivate at least one of the light emitting element and the touch sensor of the second display unit which have been activated. That is, the state of the second display unit may be switched to a ready-to-activate state. Through this method, it is possible to selectively switch the second display unit to an active state or to a ready-to-activate state as the application is executed and terminated.

The portable device 10 may detect user gesture or voice as well as the unlock trigger described above as an unlock trigger or may detect clicking on a hardware button or a touch input performed by a stylus as an unlock trigger.

Figure 8:
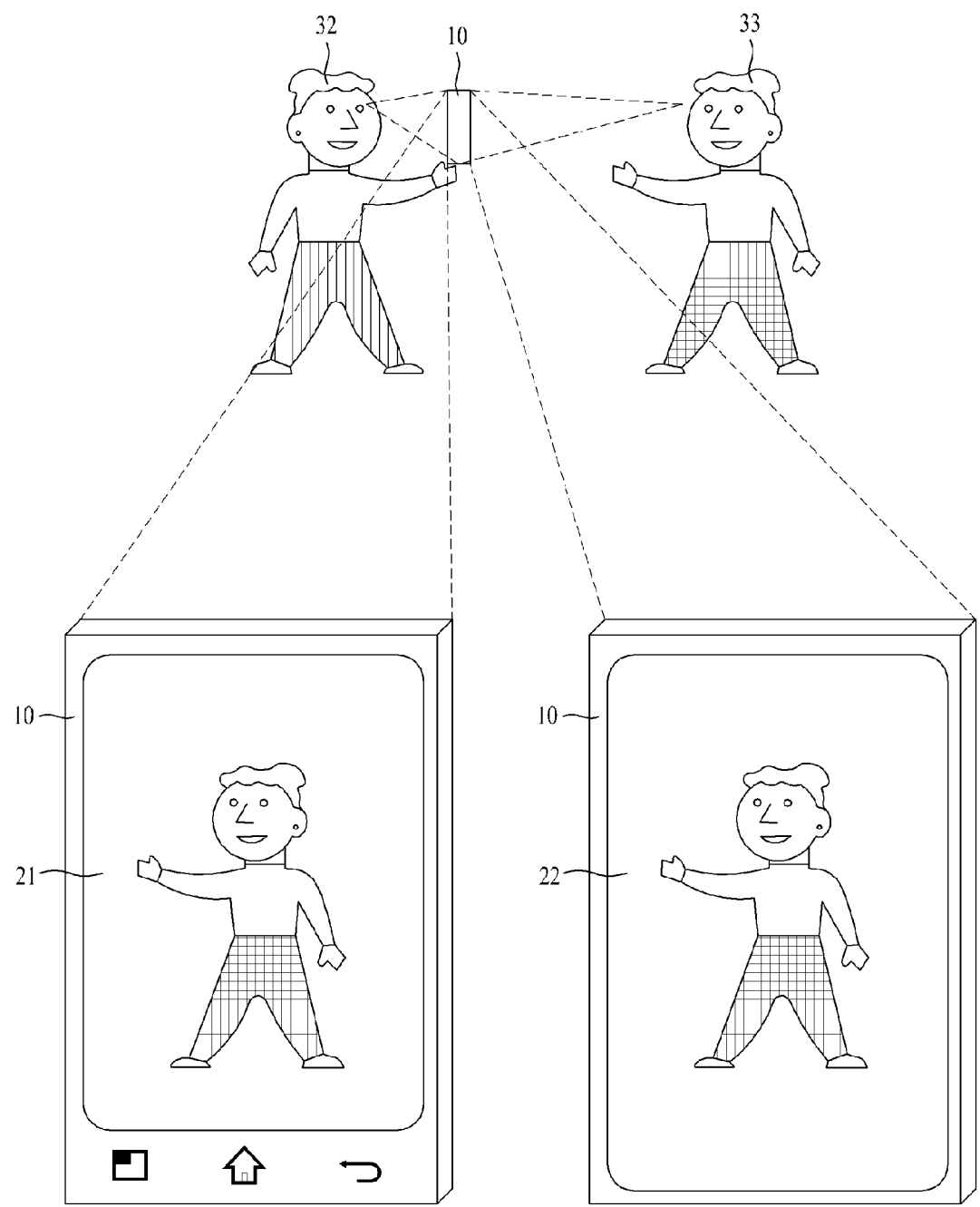
FIG. 8 illustrates a method for detecting a command to execute a camera application as an unlock trigger according to an embodiment of the present invention.

FIG. 8 illustrates a method for detecting a command to execute a camera application as an unlock trigger according to an embodiment of the present invention. When the camera application included in the portable device 10 is executed, the portable device 10 may detect execution of the camera application as an unlock trigger and switch the state of the second display unit to an active state. Accordingly, at least one of the light emitting element and the touch sensor of the second display unit may be activated.

The portable device may display a subject 33 on the first display unit 21 which faces a user 32 which is a photographer to allow the user 32 to check a preview image of a photograph of the subject in real time. The portable device 10 may also display the subject 33 on the second display unit 22 whose light emitting element has been activated to allow the subject 33 to check a preview image of their own figure through the second display unit 22. Accordingly, both the person 32 which takes a photograph and the subject 33 whose photograph is to be taken can simultaneously check the preview image to allow them to take a photograph having a desired composition. The portable device 10 may activate the touch sensor of the second display unit 22 that has been activated to allow the subject 33 to take their own photograph through touch input. That is, the subject 33 may check their own figure through the second display unit 22 and touch the second display unit 22 to take a photograph at a desired composition and timing.

Figure 9A:
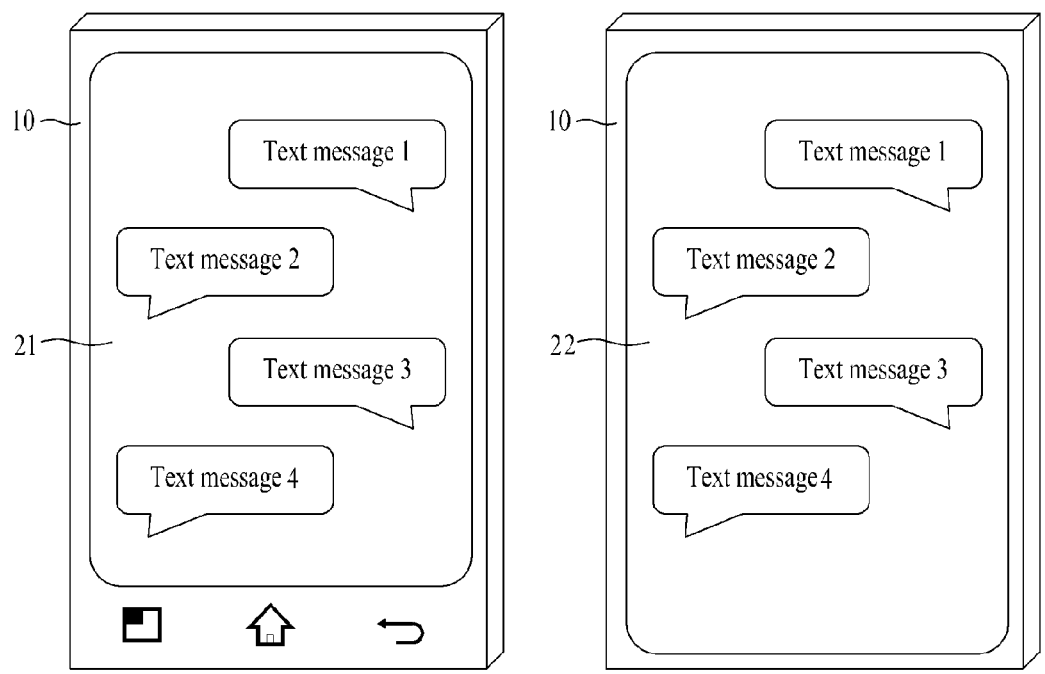
FIGS. 9A and 9B illustrate content that is displayed through an unlock trigger according to an embodiment of the present invention.

Next, FIG. 9 illustrates content that is displayed through an unlock trigger according to an embodiment of the present invention. In the example of FIG. 9A, when the state of the second display unit 22 has been switched to an active state through an unlock trigger, the portable device 10 may display the same content as that displayed on the first display unit 21 on the second display unit 22. For example, upon detecting an unlock trigger while a text message is displayed on the first display unit 21, the portable device 10 may display the same text message on the second display unit 22.

This operation may be used when a user, who is using content through the first display unit 21, desires to share the content with another user at the opposite side. That is, the portable device 10 may display the same content on the first and second display units 21 and 22 to provide the same content to a plurality of users. Accordingly, the portable device 10 can continuously provide content to a user who is using content through the first display unit 21 while simultaneously providing the content to another user, with whom the user desires to share the content, through the second display unit 22.

Figure 9B:
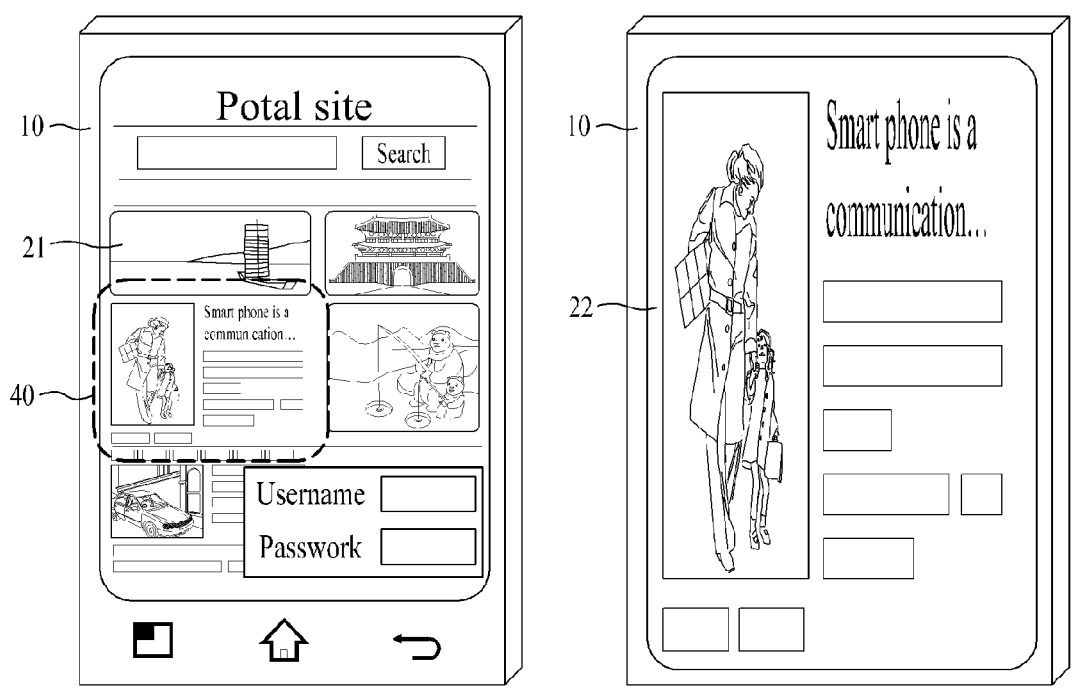

In an example of FIG. 9B, when the second display unit 22 has been activated through an unlock trigger, the portable device 10 may display detailed content linked with content displayed on the first display unit 21 on the second display unit 22.

For example, this operation is performed when the user has selected specific content 40, which is linked with detailed content, on a webpage displayed on the first display unit 21. When the user has selected the specific content 40, the portable device 10 may display the detailed content linked with the specific content 40. When an unlock trigger is detected after the detailed content is displayed on the first display unit 21, the portable device 10 may display the detailed content on the second display unit 22. When the detailed content is moved to and displayed on the second display unit 22, the portable device 10 may again display the webpage, which was being displayed before the detailed content, on the first display unit 21.

If the second display unit 22 is in an active state when the user selects the specific content 40, the portable device 10 may directly display the detailed content linked with the specific content 40 on the second display unit 22 rather than displaying the detailed content on the first display unit 21.

Since the portable device 10 displays the detailed content, which is linked with the specific content 40 on the webpage displayed on the first display unit 21, on the second display unit 22 as described above, there is an advantage in that it is possible to use the detailed content through the second display unit 22 while allowing the webpage to be continuously used through the first display unit 21.

Figure 10A:
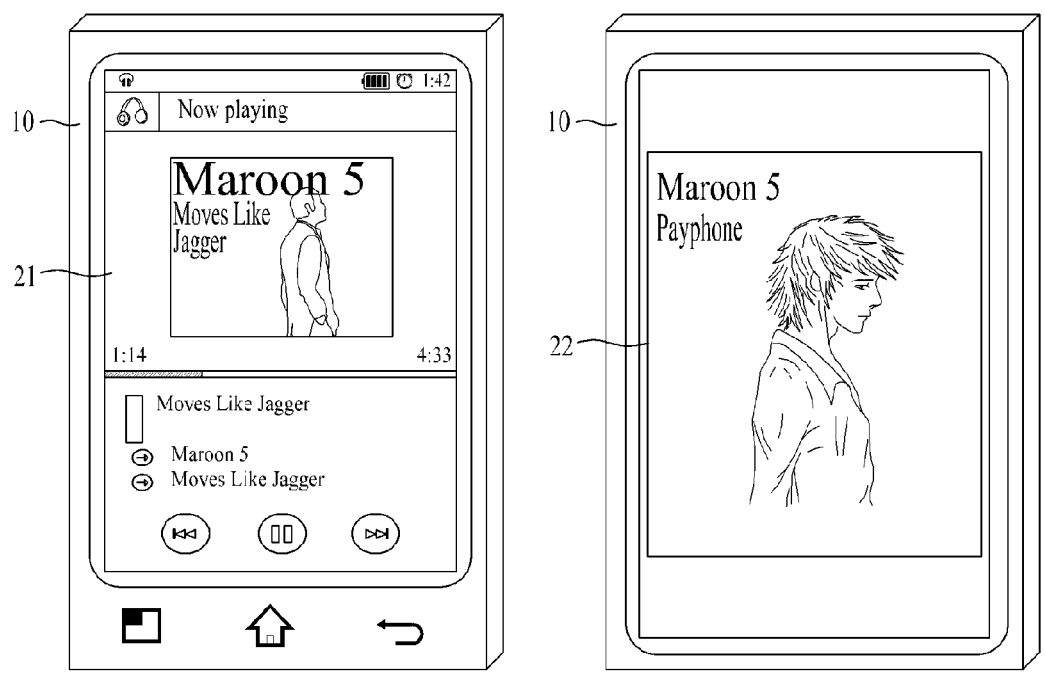
FIGS. 10A and 10B illustrate content that is displayed through an unlock trigger according to another embodiment of the present invention.

FIG. 10 illustrates content that is displayed through an unlock trigger according to another embodiment of the present invention. In the example of FIG. 10A, when the state of the second display unit 22 has been switched from an active state through an unlock trigger, the portable device 10 may display content associated with content displayed on the first display unit 21 on the second display unit 22.

For example, this operation is performed when the portable device 10 reproduces multimedia content on the first display unit 21. The portable device 10 may download information associated with the multimedia content through a network and display the downloaded information on the second display unit 22. The portable device 10 may extract data associated with the multimedia content that is being reproduced from data stored in the portable device 10 and may display the extracted data on the second display unit 22. This allows the portable device 10 to provide additional information associated with the multimedia content to the user through the second display unit 22 while continuously reproducing the multimedia content through the first display unit 21.

When a movie is being played on the first display unit 21 of the portable device 10, additional information such as information regarding actors in the movie, information regarding a director, information regarding other movies of the same director, information regarding soundtrack, information regarding film series of the movie, information regarding a producer, information regarding a production company, and information regarding film locations may be displayed on the second display unit 22.

When music is being played on the first display unit 21 of the portable device 10, additional information such as information regarding a composer and a lyric writer, information regarding a singer, information regarding other albums of the singer, information regarding other content using the music, and information regarding an album that contains the music may be displayed on the second display unit 22.

Since the portable device 10 displays content associated with multimedia content, which is being viewed by the user, on the second display unit 22, there is an advantage in that it is possible to additional information to the user.

Figure 10B:
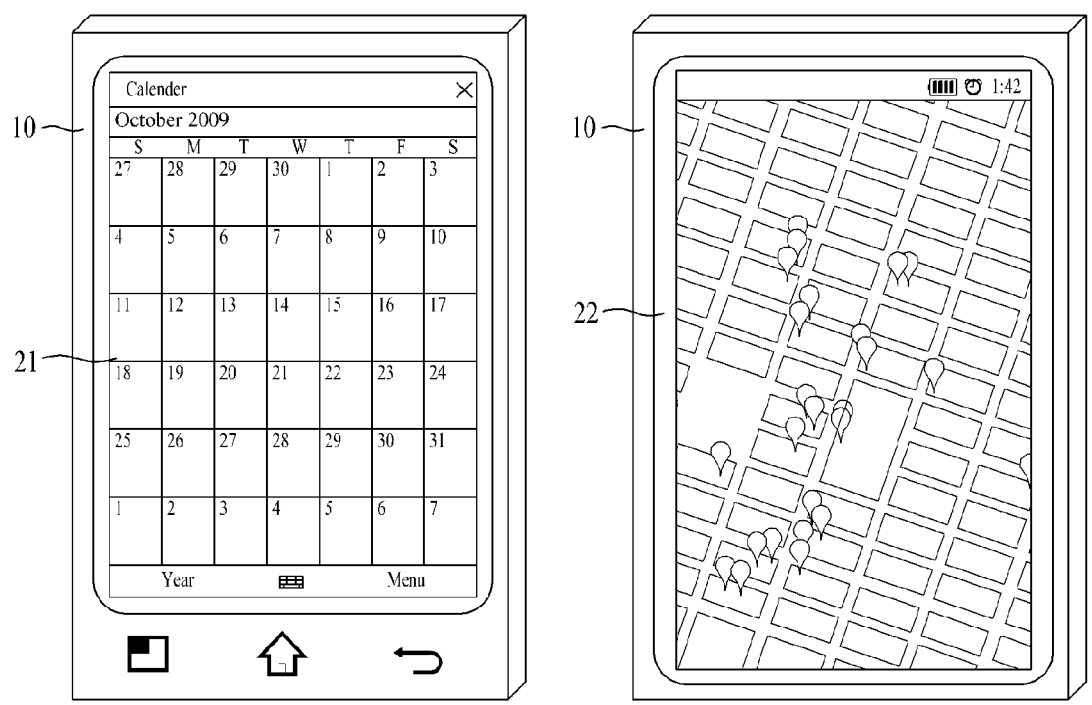

In the example of FIG. 10B, the portable device 10 may control the second display unit 22 independently of the first display unit 21 when the state of the second display unit 22 has been switched to an active state through an unlock trigger. For example, in the example of FIG. 10B, the portable device 10 may display a calendar on the first display unit 21 and may display a map application on the second display unit 22. The portable device 10 may control the first display unit 21 and the second display unit 22 independently of each other. This allows the user to independently execute two applications, which low relevance with each other, on the respective display units.

When the two applications are independently executed on the respective display units, a series of processes are performed in the following manner. When the portable device 10 has detected a second command, the portable device 10 may switch the state of the first display unit 21 to an active state and switch the state of the second display unit 22 to a ready-to-activate state. The portable device 10 may provide an application through the first display unit 21. Then, when an unlock trigger is detected, the portable device 10 may switch the state of the second display unit 22 to an active state. The portable device 10 may activate at least one of the light emitting element and the touch sensor of the second display unit 22. Here, the portable device 10 may arrange application icons on the second display unit 22 as shown in FIG. 4B and may execute a selected application on the second display unit 22 to provide the application to the second display unit 22 independently of an application executed on the first display unit 21.

Thus, the portable device can improve user convenience by providing two independent display units to the user in the above manner.

Figure 11:
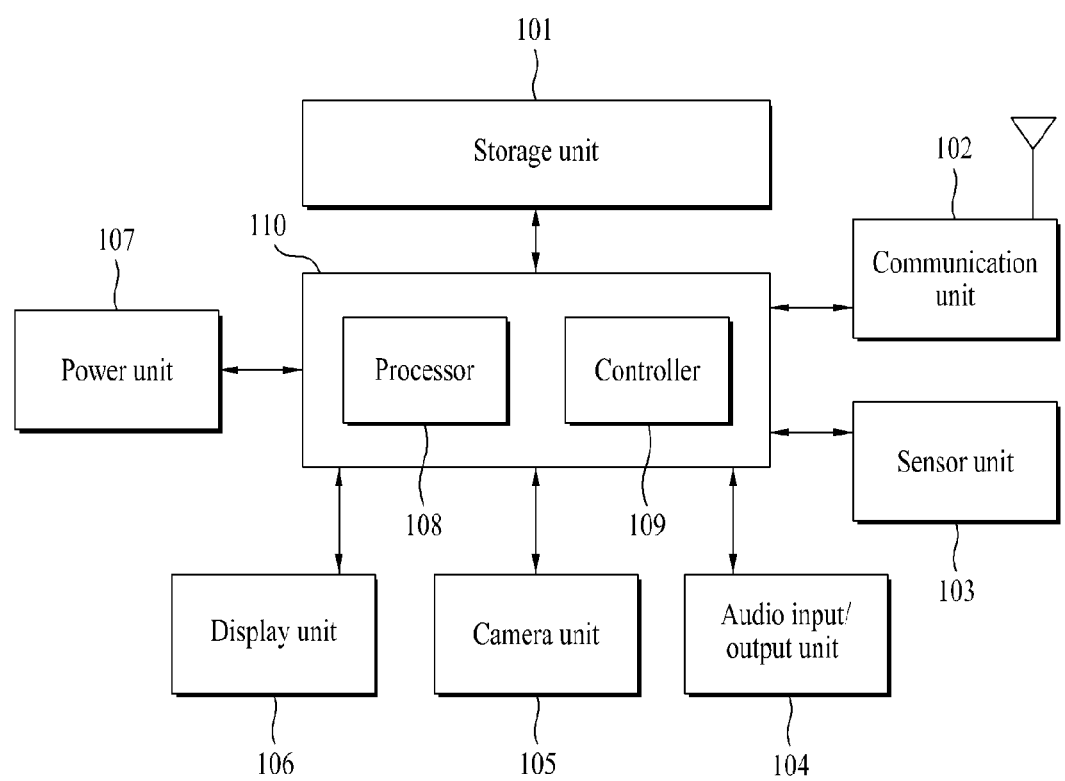
FIG. 11 is a block diagram of a portable device according to an embodiment of the present invention.

Next, FIG. 11 is a block diagram of a portable device according to an embodiment of the present invention. As shown in FIG. 11, the portable device includes a storage unit 101, a communication unit 102, a sensor unit 103, an audio input/output unit 104, a camera unit 105, a display unit 106, a power unit 107, a processor 108, and a controller 109.

The storage unit 101 may store various digital data such as video, audio, photographs, moving images, and applications. The storage unit 101 may be various digital data storage spaces such as a flash memory, a Hard Disk Drive (HDD), or a Solid State Drive (SSD). The portable device of the present invention may extract content associated with content displayed on the first display unit and display the extracted content on the second display unit. The storage unit 101 may be an optional element depending on the design of the portable device.

The communication unit 102 may perform communication and data transmission/reception with the outside of the portable device using various protocols. The communication unit 102 may connect to an external network by wire or wirelessly to transmit and/or receive digital data. The portable device of the present invention may receive content associated with content displayed on the first display unit through a network and display the received content on the second display unit. The communication unit 102 may be an optional element depending on the design of the portable device.

The sensor unit 103 may deliver an environment detected by the portable device or a user input sensed using a plurality of sensors provided on the portable device to the controller 109. The sensor unit 103 may include a plurality of sensing means. In an embodiment, the plurality of sensing means may include sensing means such as a gravity sensor, a geo-magnetic sensor, a motion sensor, a gyro sensor, an acceleration sensor, an inclination sensor, a brightness sensor, an altitude sensor, a smell sensor, a temperature sensor, a depth sensor, a pressure sensor, a bending sensor, an audio sensor, a video sensor, a Global Positioning System (GPS) sensor, and a touch sensor. In the present invention, the sensor unit 103 may detect an unlock command and an unlock trigger to unlock the first display unit and the second display unit as described above with reference to FIG. 6. The sensor unit 103 may sense rotation of the portable device or a touch input through a display unit and may deliver the sensing result to the controller 109. The sensors described above may be included as individual elements in the portable device or may be integrated into at least one element and may then be included in the portable device.

The audio input/output unit 104 may include an audio output means such as a speaker and an audio input unit such as a microphone and may perform audio output from the portable device and audio input to the portable device. The audio input/output unit 104 may be used as an audio sensor. In the portable device of the present invention, the audio input/output unit may be an optional element.

The camera unit 105 may perform still and moving image capture and may be optionally provided according to an embodiment. The camera unit 105 may be used as a visual sensor or the motion sensor described above. The portable device may detect an unlock command using the camera unit 105. The camera unit 105 may identify biometric information of the user, which may include the face, fingerprint, and iris of the user. In the portable device of the present invention, the camera unit 105 may be an optional element.

The display unit 106 may output an image to a screen. The display unit 106 may be used as the touch sensor described above when the display unit is a touch sensitive display. Accordingly, the display unit 106 may detect user input on the display unit 106 and may deliver the detected user input to the controller 109. The display unit 106 may function to display an image on a display panel or to control image display. The portable device of the present invention may include a plurality of display units 106. The display units 106 may be located at both surfaces of the portable device and may be divided into a first display unit located on the portable device at the user side and a second display unit located at the opposite side. The display units 106 may include a flexible display.

The power unit 107 may be a battery provided in the portable device or a power supply unit connected to an external power source and may supply power to the portable device. In the portable device of the present invention, the power unit may be an optional element. The processor 108 may execute various applications stored in the storage unit 101 and may process data in the portable device.

The controller 109 may control the units of the portable device and manage data transmission and reception between the units. The processor 108 and the controller 109 may be included in one chip 110 and may perform the operations described above in conjunction with each other. In this instance, the chip 110 may be referred to as a controller 109. In the present invention, when an unlock command is detected, the controller 109 may switch the state of each of the first display unit and the second display unit to one of a locked state, a ready-to-activate state, and an active state according to the detected unlock command.

In FIG. 11, which is a block diagram of the portable device according to one embodiment of the present invention, the separate blocks show the elements of the portable device as logically separated elements. Thus, the elements of the portable device may be provided as one chip or a plurality of chips according to the design of the portable device.

Figure 12:
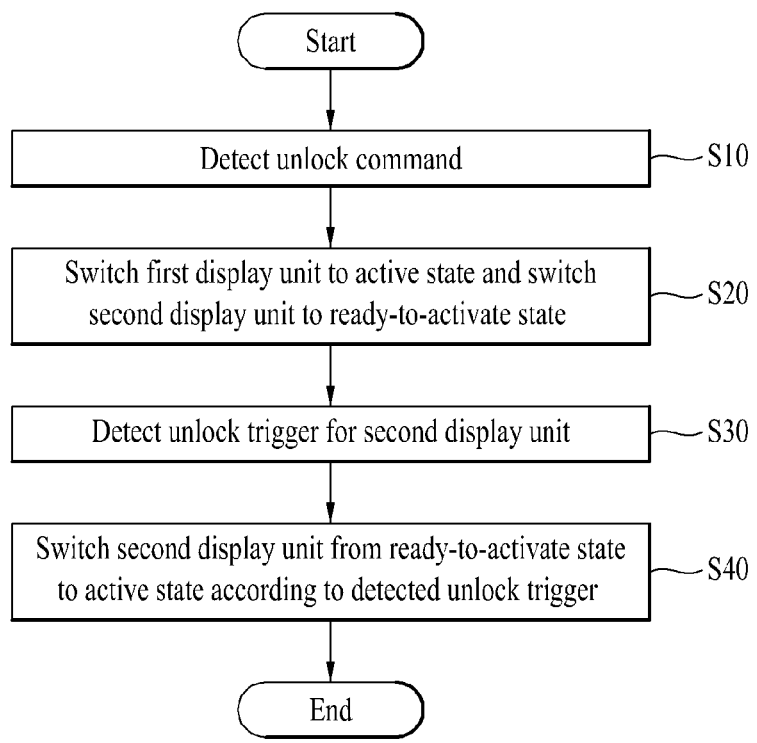
FIG. 12 illustrates a method for unlocking a display unit of a portable device according to an embodiment of the present invention.

FIG. 12 illustrates a method for unlocking a display unit of a portable device according to an embodiment of the present invention. The portable device according to the present invention may detect an unlock command (S10). As described above with reference to FIGS. 2 and 3, the portable device may identify and detect an unlock command. The portable device may detect an unlock command using the sensor unit or the camera unit and the detected unlock command may be provided to and executed by the controller. Such detection using the sensor unit may be performed using the motion sensor or the touch sensor of the display unit of the portable device. Detection using the sensor unit may be performed using a gravity sensor, a gyro sensor, an acceleration sensor, an inclination sensor, and a brightness sensor. Detection using the camera unit may be performed by identifying biometric information of the user through the camera unit. Here, the biometric information may include face, fingerprint, and iris information.

The portable device may determine whether the unlock command is the first command, the second command, or the third command based on a display region where a touch input has been detected. When the second command is detected, the portable device may switch the state of the first display unit to an active state and switch the state of the second display unit to a ready-to-activate state as described above with reference to FIG. 4A (S20). When the first display unit is in an active state, at least one of the light emitting element and the touch sensor of the first display unit may be activated according to an embodiment. The portable device may execute an application or provide content to the user using the first display unit that is in an active state.

The portable device may switch the state of the second display unit to a ready-to-activate state. Accordingly, the light emitting element and the touch sensor of the second display unit may be maintained in an inactive state.

In another embodiment of the present invention, when the portable device has detected a touch input on the second display unit as an unlock trigger, the portable device may activate the touch sensor of the second display unit which is a ready-to-activate state only for a specific portion of the second display unit as described above with reference to FIG. 7A.

The portable device may detect an unlock trigger for the second display unit after switching the state of the second display unit to a ready-to-activate state (S30). The ready-to-activate state may include rotation, movement, overturning, or the like of the portable device as described above with reference to FIGS. 5 to 8. These motions may be detected using at least one of the touch sensor, the gravity sensor, the motion sensor, the gyro sensor, the acceleration sensor, the inclination sensor, and the brightness sensor. A touch input on a displayed unlock interface, a touch input on a specific portion of the second display unit, execution of an application that runs in conjunction with the second display unit, or the like may be detected as an unlock trigger.

When an unlock trigger is detected, the portable device may switch the state of the second display unit to an active state (S40). The portable device may activate at least one of the light emitting element and the touch sensor of the second display unit.

In the step of detecting an unlock trigger, when rotation of the portable device is detected as an unlock trigger, the portable device may sequentially perform activation of the second display unit according to the rotated angle. That is, the portable device may activate the light emitting element of the second display unit when the rotated angle is a first threshold angle and activate the touch sensor of the second display unit when the rotated angle is a second threshold angle. Here, the second threshold angle may be equal to or greater than the first threshold angle. The portable device may switch the state of the first display unit to a ready-to-activate state while activating the second display unit. That is, the portable device may deactivate at least one of the light emitting element and the touch sensor of the first display unit. This allows the portable device to reduce unnecessary power consumption by the first display unit and erroneous operation caused by unintended touch.

In the step of detecting an unlock trigger, when execution of an application that runs in conjunction with the second display unit is detected as an unlock trigger, the portable device may switch the state of the second display unit to an active state upon execution of the application. In this case, the portable device may activate at least one of the light emitting element and the touch sensor of the second display unit and the second display unit may be maintained in an active state while the application is executed. When the application is terminated, the portable device may switch the state of the second display unit to a ready-to-activate state and deactivate at least one of the light emitting element and the touch sensor of the second display unit.

As described above with reference to FIGS. 9 and 10, content identical to or associated with content displayed on the first display unit may be displayed on the second display unit which is in an active state and the associated content may be extracted from the portable device or may be received through a network and may then be displayed on the second display unit. In another embodiment, the portable device may control the second display unit independently of the first display unit and may display two applications or content items, which have low relevance with each other, respectively on the first and second display units.

Since the portable device of the present invention switches the state of the second display unit to an active state according to an unlock trigger after switching the state of the second display unit to a ready-to-activate state in response to an unlock command as described above, there is an advantage in that it is possible to achieve power saving and to prevent erroneous operation caused by unintended touch input.

Figure 13:
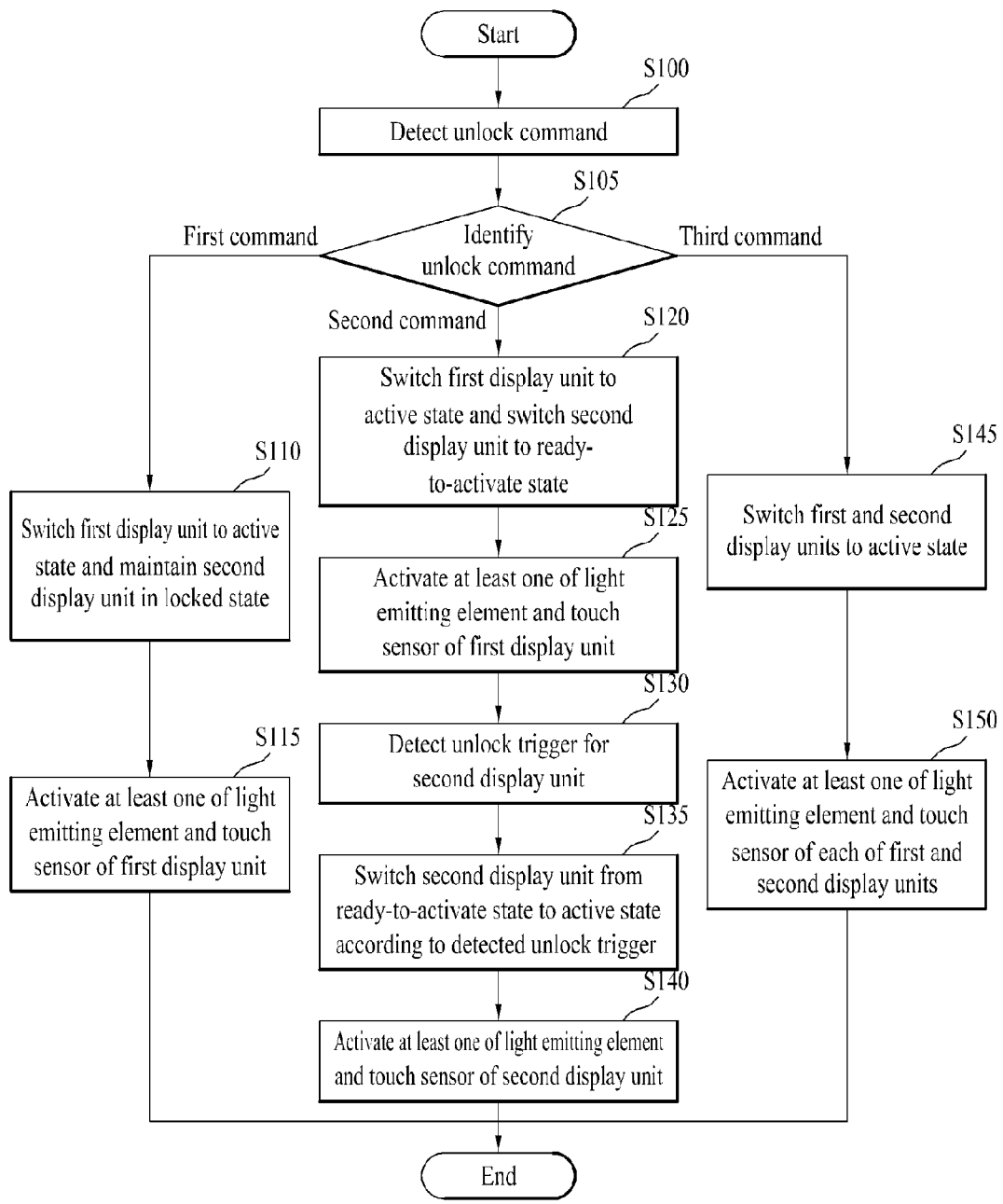
FIG. 13 is a flowchart illustrating a method for unlocking a display unit of a portable device according to another embodiment of the present invention.

FIG. 13 is a flowchart illustrating a method for switching the state of a display unit of a portable device according to an embodiment of the present invention. The portable device of the present invention may detect an unlock command (S100). The unlock command may be detected through the sensor unit of the camera unit of the portable device when the first and second display units are in a locked state. The unlock command may be detected not only using the touch input based method described above with reference to FIGS. 2 and 3 but may also be detected by sensing voice or gesture of the user or by sensing a motion of the portable device.

The portable device identifies the detected unlock command (S 105). As described above with reference to FIG. 1, the unlock command may be one of the first command which is to switch the state of the first display unit to an active state and to maintain the state of the second display unit, which is at the opposite side to the first display unit, in a locked state, the second command which is to switch the state of the first display unit to an active state and to switch the state of the second display unit to a ready-to-activate state, and the third command which is to switch the states of the first and second display units to an active state.

When the detected unlock command is the first command, the portable device may switch the state of the first display unit to an active state and maintain the state of the second display unit in a locked state (S110). The portable device may activate at least one of the light emitting element and the touch sensor of the first display unit (S115). The portable device may provide content or execute an application using the first display unit which is an active state. In this case, the portable device does not activate the second display unit, which is in a locked state, even when an unlock trigger is detected.

When the detected unlock command is the second command, the portable device may switch the state of the first display unit to an active state and switch the state of the second display unit to a ready-to-activate state (S120). The portable device may activate at least one of the light emitting element and the touch sensor of the first display unit (S125). When the second display unit is in a ready-to-activate state, the second display unit may be switched to an active state upon detection of an unlock trigger and cannot provide an application or content. However, the second display unit may display a guide message regarding an unlock trigger or may detect a touch input in order to detect an unlock trigger according to an embodiment.

The portable device may detect an unlock trigger for the second display unit which is in a ready-to-activate state (S130). The unlock trigger may be detected by sensing rotation, movement, or overturning of the portable device as described above with reference to FIGS. 5 to 8. The unlock trigger may also be detected by sensing a touch input on the first display unit or the second display unit and may also be detected through a command to execute an application which uses both the first and second display units.

When the unlock trigger is detected, the portable device may switch the second display unit from a ready-to-activate state to an active state (S135). The second display unit which is in an active state may display content associated with content displayed on the first display unit as described above with reference to FIGS. 9 and 10. For example, the second display unit may display the same content as that displayed on the first display unit, display detailed content linked with the content of the first display unit, or display information associated with multimedia content that is being reproduced on the first display unit.

In another embodiment, the second display unit may display content independently of the first display unit. The second display unit may arrange and display icons of applications when the second display unit is in an active state and may display an application executed by the user among the applications. In this manner, the second display unit may display content or an application independently of the first display unit.

When the detected unlock command is the third command, the portable device may switch the state of each of the first display unit and the second display unit to an active state (S145). The portable device may activate at least one of the light emitting element and the touch sensor of each of the first and second display units (S150). The portable device may provide content or execute an application using the first and second display units which are in an active state.

As described above, the portable device of the present invention can identify an unlock command and may switch the state of each of the first and second display units differently according to the identified unlock command. In addition, since the state of the second display unit is sequentially switched from a locked state to a ready-to-activate state and an active state, there is an advantage in that it is possible to prevent unnecessary power consumption or erroneous operation caused by unintended touch input.

As is apparent from the above description, a portable device including a plurality of display units at both surfaces thereof and a method for controlling the portable device according to the present invention have a variety of advantages.

For example, even when the user has not performed an individual unlock operation for each of the plurality of display units, it is possible to reflect the user's intention, allowing the user to unlock each display unit or to simultaneously unlock the plurality of display units.

In addition, it is possible to prevent erroneous operation caused by unintended touch when the user rotates the portable device in order to use the rear display unit of the portable device.

Further, it is possible to prevent unnecessary power consumption by switching at least one of the display units to a ready-to-activate state.

Furthermore, content associated with content displayed on a first display unit which is located at the user side can be displayed on a second display unit which is located opposite the first display unit and therefore it is possible to provide the user with the content associated with the content displayed on the first display unit while allowing the user to continuously use the content displayed on the first display unit.

Moreover, the same content as that displayed on the first display unit which is located at the user side can be displayed on the second display unit which is located opposite the first display unit and therefore it is possible to share the content with another user which is located opposite the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable device comprising:
   a first and a second display unit at opposing surfaces of the portable device configured to display digital information;
   a camera unit configured to acquire the digital information; and
   a controller configured to:
   detect an unlock command for switching a state of the first display unit from a first locked state to an active state and switching a state of the second display unit from a second locked state to a ready-to-activate state,
   switch the state of the first display unit to the active state and switch the state of the second display unit to the ready-to-activate state when the unlock command is detected,
   detect a control input, executing a camera application, as an unlock trigger for switching the state of the second display unit, which is in the ready-to-activate state, to the active state,
   switch the state of the second display unit, which is in the ready-to-activate state, to the active state according to the detected unlock trigger, and
   display the acquired digital information in the first and the second display units in the active state,
   wherein the ready-to-activate state is an intermediate state between the second locked state and the active state.

2. The portable device according to claim 1, wherein the unlock trigger is generated when the camera unit is activated or faces a user.

3. The portable device according to claim 1, wherein the unlock trigger is generated upon execution of an application that operates in conjunction with the camera unit.

4. The portable device according to claim 3, wherein, when the application that operates in conjunction with the camera unit is executed, the switching of the state of the second display unit to the active state includes the controller activating at least one of a light emitting element and a touch sensor of the second display unit according to control of the application.

5. The portable device according to claim 1, wherein the first display unit faces a user and the second display unit faces the opposite direction of the first display unit in the closed position.

6. The portable device according to claim 1, wherein when the controller detects the unlock trigger for the second display unit, the controller is further configured to display detailed content on the second display unit associated with the content displayed on the first display unit.

7. The portable device according to claim 1, wherein, in the ready-to-activate state, the state of the second display unit is switched to the active state by detecting the unlock trigger without simultaneously detecting the unlock command.

8. The portable device according to claim 1, wherein the digital information is a preview image of a photograph of a subject.

9. The portable device according to claim 8, wherein the controller is further configured to display the preview image in real time.

10. The portable device according to claim 1, wherein the controller is further configured to activate a touch sensor of the second display unit.

11. The portable device according to claim 10, wherein the controller is further configured to take a photograph when the activated touch sensor of the second display unit detects a touch input.

12. The portable device according to claim 1, wherein, in the first locked state, the first display unit partially activates a touch sensor or a light emitting element.

13. The portable device according to claim 1, wherein, in the second locked state, a light emitting element and a touch sensor of the second display unit are inactive.

14. The portable device according to claim 1, wherein the first locked state of the first display unit is identical with the second locked state of the second display unit.

15. The portable device according to claim 1, wherein the unlock trigger is generated when the second display unit faces a user.

16. A method for controlling a portable device including first and second display units at opposing surfaces of the portable device, the method comprising:
- detecting an unlock command for switching a state of the first display unit from a first locked state to an active state and switching a state of the second display unit from a second locked state to a ready-to-activate state,
- switching the state of the first display unit to the active state and switching the state of the second display unit to the ready-to-activate state when the unlock command is detected,
- detecting a control input, executing a camera application, as an unlock trigger for switching the state of the second display unit, which is in the ready-to-activate state, to the active state,
- switching the state of the second display unit, which is in the ready-to-activate state, to the active state according to the detected unlock trigger, and
- displaying the acquired digital information in the first and the second display units in the active state,
- wherein the ready-to-activate state is an intermediate state between the second locked state and the active state.

17. The method according to claim 16, wherein the unlock trigger is generated when a camera unit of the portable device is activated or faces a user.

18. The method according to claim 16, wherein the unlock trigger is generated upon execution of an application that operates in conjunction with a camera unit of the portable device.

19. The method according to claim 18, wherein, when the application that operates in conjunction with the camera unit is executed, the switching of the state of the second display unit to the active state includes the controller activating at least one of a light emitting element and a touch sensor of the second display unit according to control of the application.

20. The method according to claim 16, wherein the first display unit faces a user and the second display unit faces the opposite direction of the first display unit in the closed position.

21. The method according to claim 16, further comprising:
- displaying detailed content on the second display unit associated with the content displayed on the first display unit, when the unlock trigger for the second display unit is detected.

22. The method according to claim 16, wherein, in the ready-to-activate state, the state of the second display unit is switched to the active state by detecting the unlock trigger without simultaneously detecting the unlock command.

23. The method according to claim 16, wherein the digital information is a preview image of a photograph of a subject.

24. The method according to claim 23, further comprising:
- displaying the preview image in real time.

25. The method according to claim 16, further comprising:
- activating a touch sensor of the second display unit.

26. The method according to claim 25, further comprising:
- capturing a photograph when the activated touch sensor of the second display unit detects a touch input.

27. The method according to claim 16, wherein, in the first locked state, the first display unit partially activates a touch sensor or a light emitting element.

28. The method according to claim 16, wherein, in the second locked state, a light emitting element and a touch sensor of the second display unit are inactive.

29. The method according to claim 16, wherein the first locked state of the first display unit is identical with the second locked state of the second display unit.

30. The method according to claim 16, wherein the unlock trigger is generated when the second display unit faces a user.

* * * * *